United States Patent [19]
Knecht et al.

[11] Patent Number: 4,730,496
[45] Date of Patent: Mar. 15, 1988

[54] CAPACITANCE PRESSURE SENSOR

[75] Inventors: Thomas A. Knecht, Eden Prairie; Roger L. Frick, Chanhassen, both of Minn.

[73] Assignee: Rosemount Inc., Eden Prairie, Minn.

[21] Appl. No.: 877,281

[22] Filed: Jun. 23, 1986

[51] Int. Cl.⁴ .......................... G01L 7/08; G01L 9/12
[52] U.S. Cl. ........................................ 73/724; 73/706; 73/708; 73/718; 361/283
[58] Field of Search ............... 73/724, 718, 708, 706, 73/756, DIG. 4; 361/283

[56] References Cited

U.S. PATENT DOCUMENTS

| | | | |
|---|---|---|---|
| 3,277,719 | 10/1966 | Prell | 73/407 |
| 4,068,206 | 1/1978 | Popp | 338/36 |
| 4,084,438 | 4/1978 | Lee et al. | 73/706 |
| 4,168,518 | 9/1979 | Lee | 361/283 |
| 4,204,244 | 5/1980 | Ho | 361/283 |
| 4,207,604 | 6/1980 | Bell | 361/283 |
| 4,227,419 | 10/1980 | Park | 73/724 |
| 4,261,086 | 4/1981 | Giachino et al. | 29/25.41 |
| 4,277,814 | 7/1981 | Giachino et al. | 361/283 |
| 4,390,925 | 6/1983 | Freud | 361/283 |
| 4,405,970 | 9/1983 | Swindal et al. | 361/283 |
| 4,415,948 | 11/1983 | Grantham et al. | 361/283 |
| 4,422,335 | 12/1983 | Ohnesorge et al. | 73/724 |
| 4,424,713 | 1/1984 | Kroninger, Jr. et al. | 73/718 |
| 4,425,799 | 1/1984 | Park | 73/718 |
| 4,426,673 | 1/1984 | Bell et al. | 361/283 |

FOREIGN PATENT DOCUMENTS 56-208670  12/1981  Japan .
0233863    11/1985  Japan ................................. 361/283

OTHER PUBLICATIONS

Behr, M. E. et al, "Miniature Silicon Capacitance Absolute Pressure Sensor," *I Mech E* (1981).
Technology Report, "Sensor ICS: Processing, Materials Open Factory Doors," *Electronic Design*, Apr. 18, 1985.

*Primary Examiner*—Donald O. Woodiel
*Attorney, Agent, or Firm*—Kinney & Lange

[57] ABSTRACT

A capacitive pressure sensor that is fabricated by a batch process affords isolation for the sensing element and leads from the pressure media and provides stress isolation as well. The pressure sensor is made up of a sandwich construction including a silicon wafer which is etched from one side to make cavities in a plurality of desired locations to form deflecting diaphragms, one surface of which acts as a capacitor plate. A glass layer is metalized on both sides and has holes drilled in locations that align with the diaphragms formed on the silicon wafer. The glass layer is anodically bonded to the wafer to form capacitance gap of a few microns relative to the one surface of each diaphragm. The assembly of the metalized glass layer and the silicon wafer is in a preferred form sandwiched between two additional layers, and bonded together in a vacuum atmosphere. The four layer sandwich is then cut up into individual sensors. The initial assembly can be formed to provide dampening of the diaphragm response times and to minimize the likelihood of false signals at high frequency inputs.

17 Claims, 12 Drawing Figures

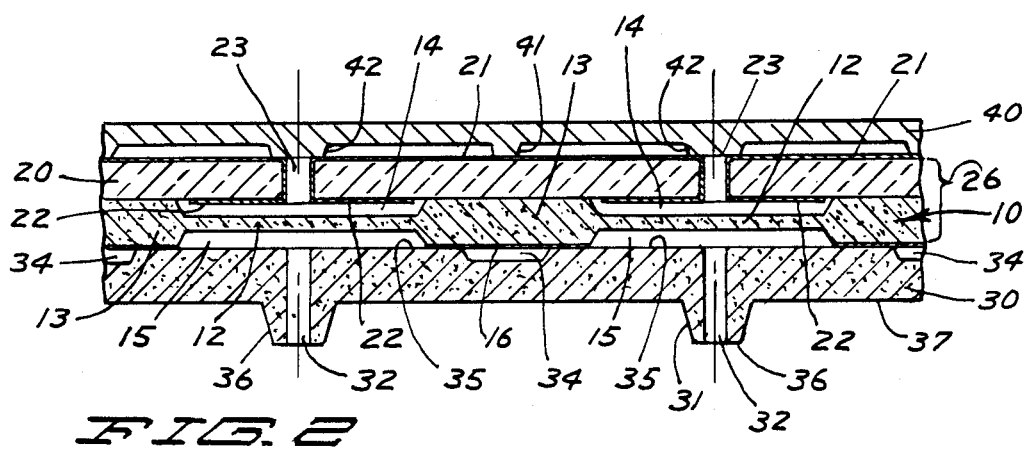
FIG. 2
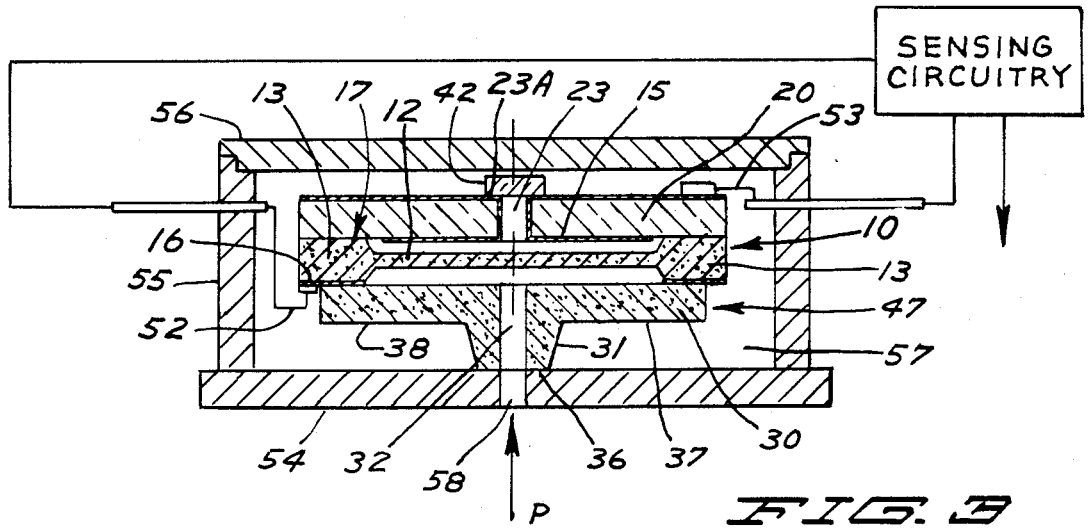
FIG. 3
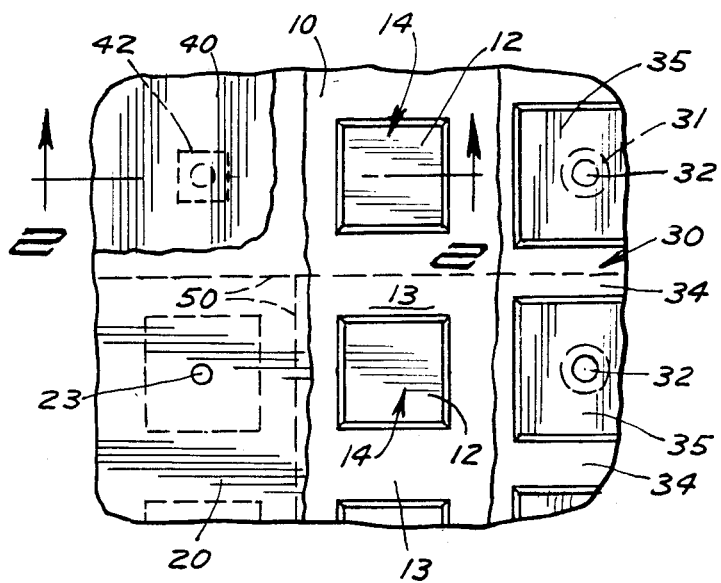
FIG. 1
FIG. 4

CAPACITANCE PRESSURE SENSOR

BACKGROUND OF THE INVENTION

1. Field of the Invention.

The present invention relates to miniature capacitance pressure senors using a dielectric layer which mounts to a semi-conductor diaphragm formed into a stress isolated and pressure media isolated sensor. The dielectric layer has a metalized capacitor plate facing the diaphragm and a metalized hole in the dielectric layer that permits evacuation of the diaphragm sensing chamber and provides an electrical feedthrough after sealing. Another aspect of this invention is to provide a dampening action for a pressure media isolated sensor to mechanically reduce false signals in output digital sampling circuits and provide the features using batch fabrication techniques.

2. Description of the Prior Art.

Capacitance pressure sensors using silicon diaphragms are described in an article entitled minature silicon Capacitance Absolute Pressure Sensor (M. E. Behr et al., I. Mech E. 1981). The article describes a silicon wafer used for forming a diaphragm. The wafer is mounted onto a glass substrate, with a metalized layer in the glass forming a capacitor electrode or plate spaced from and facing the diaphragm. Electrical connections to the diaphragm and to the capacitor plate are provided through metalized layers in openings through the glass. However, the problem of having electrical lead feedthroughs and also having openings for evacuating the chambers formed by the diaphragm and being able to make the sensors in a batch process continues. Further, stress isolation (isolating the diaphragm from external stresses) of such a sensor is a problem.

A review of prior art techniques of forming integrated circuit sensors is provided in an article entitled *Sensor IC's: Processing, Materials Open Factory Doors*, by Frank Goodenough; Electrical Design, Apr. 18, 1985, pp. 131–148.

Another problem that is present in miniature capacitive pressure transducers using rigid materials, such as silicon or other semi-conductors, is that the frequency response of the diaphragm is quite high, and when used with digital sampling circuitry, the diaphragm response frequency can become too high to be analyzed with the sampling interval being used for sensing the capacitive value. Such sampling circuitry provides output signals from capacitive sensing circuites by sampling the capacitive output signals at fixed time intervals. The frequency response of silicon diaphragms is high enough so dampening or low pass filtering is needed before the data is sampled to prevent aliasing errors resulting from noise signals near or above the sampling frequency. It is preferable to introduce mechanical dampening of the sensing element, but this is a substantial problem with miniature solid state sensors which have very small volumentric spacings when using known arrangements.

SUMMARY OF THE INVENTION

The present invention relates to miniature capacitance pressure sensors that are preferably constructed with semi-conductor diaphragms mounted on metalized dielectric layers to permit batch fabricating the sensors. A diaphragm and a facing metalized layer form capacitor plates, and when the diaphragm deflects under pressure the capacitance between the plates changes. The dielectric layers include through holes that are metalized, and which are electrically connected to a second metalized layer on the opposite side of the dielectric layer from the capacitor plate. The metal layer in the holes forms a lead for circuitry and the hole provides for evacuating the cavity between the diaphragm and the capacitor plate formed on the dielectric layer. The hole can be covered and sealed in a batch fabrication process and the second metal layer exposed and used for attaching leads.

The present invention typically is a pressure sensor having a substrate or base of dielectric, preferably glass, such as Pyrex (boro-silicate) glass.

In a preferred form, a P-type silicon wafer is etched from both sides in a plurality of desired locations. The etching is deep on one side of the wafer to form the sensing diaphragms (or membranes) and the other side of the wafer is etched in a location aligning with the diaphragm location to a small depth to form a sensing cavity. The wafer is metalized on the first side (opposite the sensing cavity) and annealed to form an ohmic contact between the metal layer and the silicon.

A glass disc has small holes formed in it in locations centered on the diaphragms of the wafer and this disc is then metalized on both sides (including through the holes). On one side the metal layer is masked to form separated capacitor plates each of which is centered on one hole and thus the metal layer forming capacitor plates wil align with the diaphragms formed on the silicon wafer. The glass disc or layer is then placed over the silicon wafer in position so that the metalized plates on the side of the glass disc facing the silicon wafer are properly positioned over the diaphragms on the silicon wafer. The capacitor plates formed on the layer glass disc are electrically insulated from the silicon wafer, but the metalizing in each hole in the glass, which is centered on the respective capacitor plates formed electrically connects the capacitor plates on the glass to the metalized layer on the opposite side of the glass disc.

The silicon wafer and glass disc are bonded in regions surrounding each diaphragm to form gaps of a few microns in the diaphragm area. The gap between the glass disc and the silicon wafer forms a cavity or chamber which is sealed around its periphery but which is open to the exterior through the metalized hole. The assembly of the glass disc or layer and silicon wafer then may be used for forming an absolute pressure sensor, and if so, the assembly is aligned with third and fourth wafers or discs. The third disc or layer overlying the first mentioned glass disc may be either glass or silicon, and has bosses formed in the surface facing the first glass disc. The bosses are positioned to cover and seal the holes in the first mentioned glass disc which have the metal layer therein. When the assembly of discs is placed into a vacuum environment and the third disc bonded to the first mentioned glass disc, the third disc will effectively seal the sensing cavity between the diaphragm and the glass disc. The holes in the glass disc therefore provide both a feedthrough for electical signals from the capacitor plates formed and a way of evacuating and sealing the cavity over the diaphragm in a batch fabrication process. Portions of the third layer are removed to expose the metal layer for attaching contacts, but leaves the hole sealed.

The fourth layer, positioned to the outside of the first mentioned silicon wafer that has the diaphragms formed thereon (the side opposite from the first glass disc), is usually made of silicon and has passageways leading to the cavities created from forming the diaphragms. The passageways in the fourth layer are for admitting fluid (media) under pressure to act on the diaphragms. The fourth disc, as shown, has stress isolating necks extending outwardly from the assembly and surrounding the pressure passageways. The fourth disc is bonded in place in a vacuum atmosphere as well.

A glass frit or anodic bond can be used for bonding the outer two layers (the third and fourth layers) to the initial assembly of the silicon wafer and the first glass disc. This four layer sandwich is then diced (cut up) to form individual sensors.

In the present invention, if desired, where response dampening or isolation is desired, the initial assembly of the wafer and the first mentioned glass disc will be made as disclosed, but the fourth layer or cover on the side of the wafer opposite from the first mentioned glass disc is arranged somewhat differently and is placed over the diaphragm on the side opposite from the first glass disc. The cover layer has bosses which fit into the diaphragm cavities to form small volume dampening chambers on the side of the diaphragms opposite from the active capacitor surface of the diaphragms. The small volume chambers are fluid filled (with silicone oil) and open through small passageways to an isolation chamber which transmits pressure acting on an isolation diaphragm. Such pressure will deflect the sensing diaphragm. The pressure opening to the diaphragm that provides dampening as shown is either a laser drilled hole in the fourth layer or cover, or comprises shallow lateral grooves formed in the region of the diaphragm support rim leading to the dampening chamber. The grooves can be formed in the silicon wafer or in the fourth layer when etching these layers, to provide small, restricted opening(s) to the dampening chambers, where pressure will act on the diaphragm.

The fluid in such small volume dampening chambers must flow through the restrictions as the diaphragm deflects to thereby dampen the frequency response of the diaphragm. Utilizing a very small internal volume for the dampening oil or fluid makes fluid filling such dampening chambers an easier task.

The ability to dampen the response of the diaphragm mechanically, as shown, eliminates the need for additional filtering in the sensing circuitry that is used. Conventional data sampling circuitry may thus be used with the present device, and the fluid dampening is intended to keep the frequency response of the diaphragm in the range of less than one-half of the sampling frequency of the circuitry.

BRIEF DESCRIPTION OF THE DRAWINGS

FIG. 1 is a top plan view of a segment of a batch of pressure sensors with parts broken away to show the layers used for making sensors according to the present invention;

FIG. 2 is an enlarged sectional view taken generally along line 2—2 in FIG. 1, showing complete sensor assemblies made according to the present invention in a batch manufacturing process;

FIG. 3 is a sectional view of an individual pressure sensor shown in FIG. 2, after separating such sensor from other sensors formed in the same batch and after mounting the sensor in an outer housing;

FIG. 4 is a fragmentary enlarged sectional view of a section of a glass layer used to make the present sensor showing details of a metalized feedthrough hole;

DETAILED DESCRIPTION OF THE PREFERRED EMBODIMENTS

Figure 5:
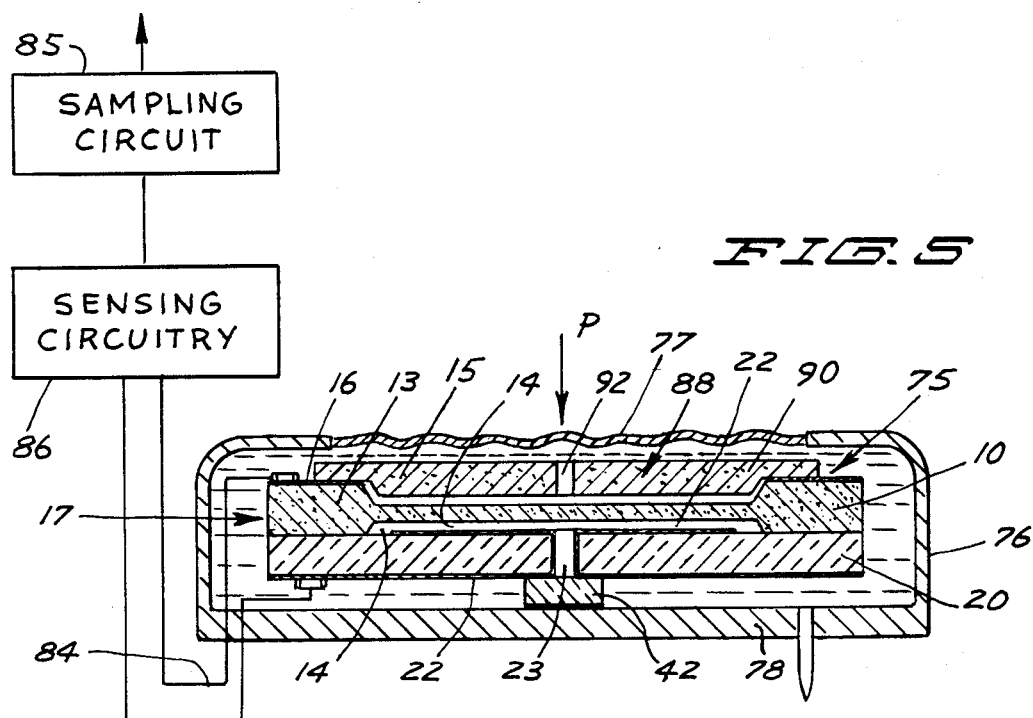
FIG. 5 is a sectional view of a modified form of the present invention used in an oil filled housing having an isolation diaphragm, and with a sensor made according to the present invention installed therein, and including response dampening features.

As shown in FIG. 1, a first layer or disc of a dielectric (glass) 20 has a silicon wafer indicated generally at 10 (illustrated in the center portion of FIG. 1) mounted thereto. The silicon wafer 10 is prepared by etching it to provide a plurality of sensing diaphragm members 12 surrounded by a rim portion 13. The diaphragm members 12 and rim portion 13 on a first side of the wafer, form a cavity 14 in cooperation with the glass disc. On the second, opposite side (see FIG. 2) a recess 15 is made sufficiently deep so that the sensing diaphragms 12 are sufficiently thin for operation in the pressure range desired. Each rim 13 and associated diaphragm 12 form a diaphragm assembly 17. The silicon wafer is metalized on the second surface, opposite from the capacitive cavity 14, as shown at 16 in FIG. 2, and annealed to form an ohmic contact between the metal layer and the silicon.

Suitable holes are drilled through the dielectric disc or first glass layer 20, so that the holes indicated at 23 will overlie the capacitance cavities 14 on the wafer 10. The dielectric disc 20 is then metalized on both sides to form a metal layer 21 on one side and metal capacitor plate layer portions 22 on the other side in regions which overlie the diaphragms 12. The surface of disc 20 can be masked in a known manner to form the capacitor plate portions. The inner surface of holes 23 are also metalized so metal layer 21 and metal capacitor plate layer portions 22 are electrically connected. The holes 23 are of sufficient size so they are not plugged during metalization.

The silicon wafer 10 and the metalized glass disc or layer 20 are placed into registry so that the holes 23 are substantially centered on the sensing diaphragms 12 and the glass disc rests on rims 13 to enclose the capacitance cavities 14.

The disc or first layer 20 and wafer or second layer 10 are bonded together along rims 13 to seal the capacitance cavities 14. Capacitance gaps of only a few microns are formed between the capacitance plate layers 22 and the facing surface of the corresponding diaphragm 12 in the capacitance cavity. The capacitance plate layers 22 are insulated from the rims 13 and thus form capacitor plates relative to the aligning diaphragm 12 which forms a second capacitor plate. The cavities 14 are open to the exterior through the openings 23 at this stage of processing.

In order to complete the batch processing for making the assemblies, as shown in FIGS. 1 and 2, the subassembly 26 of the silicon wafer 10 and the glass disc or layer 20 is then, in turn, sandwiched with two more discs or layers.

A cover wafer or third layer of silicon or glass indicated generally at 40 is first etched to provide for peripheral rims 41 (see FIG. 2) that form a peripheral support along lines surrounding the sensing diaphragms 12 that have been formed on wafer 10. The rims 41 surround the diaphragm when the layers are assembled together. Additionally, substantially planar sealing bosses 42 are provided at locations on the third layer 40 that align with the substantially planar surface 23A surrounding metalized openings 23 in the glass disc or first layer 20. The assembly is then made so that the rims 41 and bosses 42 are bonded to the exposed surface of metal layer 21 of the glass disc 20. The bonding can be anodic bonding or carried out using a glass first in the lines of contact. The bonding is generally done in a vacuum, so that the capacitive chambers or cavities 14 are at a reduced pressure and the cavities 14 are sealed by bosses 42 at such reduced pressure.

A fourth layer 30, which can be made of silicon as well, is used to support the wafer 10 on a side of wafer 10 opposite from glass disc or layer 20. The fourth layer 30 is etched before assembly so that it has, on one side, a plurality of necks or posts 31 centered on the cavities 15 and extending outwardly from the side of the third layer 30 facing away from the diaphragms. A passageway 32 is formed through each neck 31 and extends through the layer 30. Additionally, grooves indicated at 34 are formed on the side of layer 30 opposite from the necks to divide out bosses 35 that align with and span the cavities or recesses 15 that are formed in the silicon wafer 10 and underlie the rims 41. As shown in FIGS. 1, 2 and 3 the recesses 34 surround each of the regions where the diaphragms are formed on the wafer 10. It can be seen that the necks 31 have end surfaces 36 that are spaced from the surface 37 on that side of the layer 30. The material is etched away in the location of recesses 34 to form the bosses 35 in a known manner. The layer 30 is bonded to the wafer 10 at the contacting surfaces.

The four layer sandwich can be further processed to remove the layer 40 except for the bosses 42, so that the openings 23 remain sealed, but the metal layer 21 on glass disc 20 is exposed in the regions surrounding bosses 42. After the four layer sandwich is formed, it is diced up (cut) along lines such as that shown at 50 in FIG. 1. The cut lines are centered on the recesses 34 so that there are peripheral rims 13 around each of the sensing diaphragms 12 to form diaphragm assemblies 17. The third layer 40 is removed by cutting, or other suitable process, in regions except for bosses 42 to expose layer 21 in regions surrounding each boss 42. The exposed metal layer 21 forms a region where electrical leads can easily be attached.

After the individual sensors 47 are cut up, the layer 30 of each sensor is also cut away or etched at its periphery to remove the material aligning with the recesses 34. This trims the edges of layer 30 to a size corresponding to the bosses 35. The reduced periphery sections 38 (FIG. 3) permits a peripheral band of the metal layer 16 on wafer 10 to be exposed. A lead 52 can be attached to this layer 16. The metal layer 21 on the glass layer or disc 20 also permits a lead 53 to be attached in a conventional manner, such as welding.

The sensor 47 is mounted on a housing base member 54 by bonding the under surface 36 of the neck 31 to the housing base in a suitable manner. Base 54 supports a housing wall 55 and a cap 56 is used to form an enclosed chamber 57 inside the housing. The seal around the surface 36 of neck 31 permits pressure to be applied through an opening 58 in the base 54 and through opening 32 to chamber 15. The pressure media (the fluid being measured) is isolated from the leads 52 and 53, and the electrical connections to metal capacitor plate regions are thus not subject to corrosive fluids. The neck 31 forms a stress isolation spring support for the capacitance pressure sensor 47, so that strain in the mounting does not cause extraneous deflection of the sensing diaphragm. Streas on the pressure case does not affect the diaphragm. The capacitor chamber 14 was sealed under vacuum by boss 42 and remains sealed. The metalized hole 23 forms a signal feedthrough and an opening for evacuating the chamber 14.

In a second form of mounting, a typical sensor made according to the present invention is shown mounted in an outer isolation housing in FIG. 5. As shown, the sensor indicated generally at 75, which is inverted from the showing in FIGS. 1–4, is mounted in an outer housing 76 that has an isolation diaphragm 77 formed therein. Pressure to be measured, indicated by the arrow P acts on the isolation diaphragm 77. The interior volume of housing 76 is filled with inert oil or other inert fluid usable for dampening the diaphragm response.

The sensor 75 is supported on a base wall 78 of the housing using the sealing boss 42 shown in FIGS. 2 and 3. The sensor 76 includes a layer or disc 20 made of Pyrex glass or other suitable material, and the diaphragm assembly 17 is bonded to the layer 20. The rim 13 and deflecting sensing diaphragm 12 are formed as previously described. The diaphragm 12 is stiff or rigid and has a high frequency response. The diaphragm assembly 17 preferably is made of brittle material such as silicon, quartz, sapphire or glass. Silicon is preferred. If glass is used, the diaphragm surface can be metalized to form a suitable capacitive surface. The metal capacitive plate layer 22 on glass disc or layer 20 faces the diaphragm 12, and the layer 21 is connected to the layer 22 by the metalized layer in opening 23.

The sensor assembly 75 is formed as before with opening 23 serving as a way of evacuating the capacitive chamber 14 as well as providing an electrically conductive path between layers 21 and 22. A lead 83 is connected to metal layer 21. The diaphragm 12, when made of a semi-conductor such as silicon, can operate without any metal capacitor plate being deposited thereon, if desired. A contact can be connected from metalized layer 16 to a lead 84 to provide a second lead for capacitance sensing between the layer 22 and the facing surface of the sensing diaphragm 12, using suitable, known capacitive sensing circuitry 86.

The diaphragm 12 responds at a relatively high frequency. When the output signal of the sensing circuitry is used to obtain digital outputs, the capacitance signal at leads 83 and 84 is sampled at a selected rate. If the frequency response of the diaphragm 12 is more than approximately one-half the sampling rate or frequency of the sampling circuit shown schematically at 85, the output may provide false information (called aliasing). The desired sampling rate in relation to the message frequency is defined in the "Electronic Designer's Handbook", by Giacolleto, Second Addition, McGraw-Hill 1977, Section 22.8a, pages 22-77.

In order to provide dampening of the diaphragm response, and do it in a convenient manner, the layer 30 of FIGS. 1-4 is replaced with a layer forming a cover 88 over each recess 15. Cover 88 is formed of silicon or other rigid material which has a temperature coefficient of expansion compatible with the diaphragm assembly 17. The cover 88 is formed with an outer rim 89 that fits against the rim 13, and with a center portion 90 which is formed into a boss that fits into the recess 15 defined within the rim 13. The end surface of the boss 90 is adjacent the surface of the diaphragm 12 and preferably is spaced close to the diaphragm. The boss 90 forms a very small volume chamber shown at 91, between the diaphragm 12 and the end surface of boss 90.

A suitable, small diameter, laser drilled hole indicated at 92 is provided in the cover 88 leading to the exterior from chamber 91, and thus to the interior of any isolation housing, such as the housing 76, in which the sensor 75 is mounted. Passageway 92 has a very small cross section and is short, but with the very small volume of the chamber 91, the chamber 91 and passageway 92 are fillable with oil rather easily using known techniques, such as immersing the sensor assembly in oil in a vacuum to fill the chamber. The passageway 92 provides the necessary flow restriction or control orifice for dampening to lower the overall frequency response to the diaphragm 12 to a suitable level. The oil or filling fluid has to flow through the opening 92 as the diaphragm deflects.

The boss 90 on the cover 88 can be formed by suitable etching processes well known in the art. The cover is held in place on the diaphragm rims of water 10 with a glass frit or is bonded in some other conventional manner as described with respect to bonding layer 30 shown in FIGS. 1-4.

Figure 6:
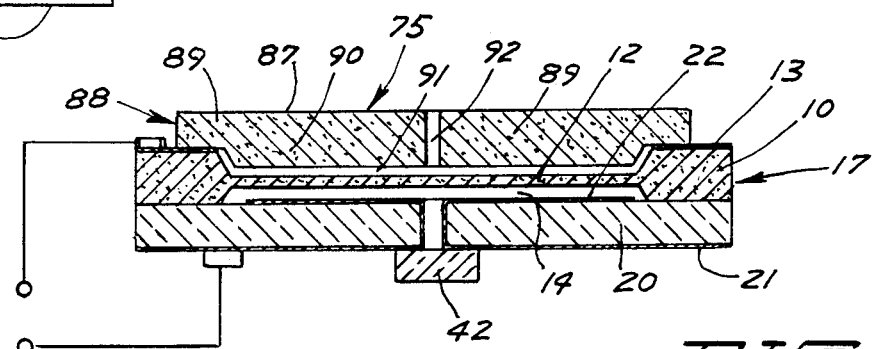
FIG. 6 is a vertical sectional view of a pressure sensor made according to the present invention with a first type of fluid dampening aperture therein.

An advantage of the present device is that the diaphragm 12 will bottom out against the glass disc or layer 20 under overpressures to prevent diaphragm damage. The sensor shown in FIGS. 5 and 6 is an absolute pressure sensor, so the diaphragm 12 does not deflect toward the boss 90 on cover 88 from a rest position under pressures to be measured. The chamber 14 is usually under at least a partial vacuum.

Figure 7:
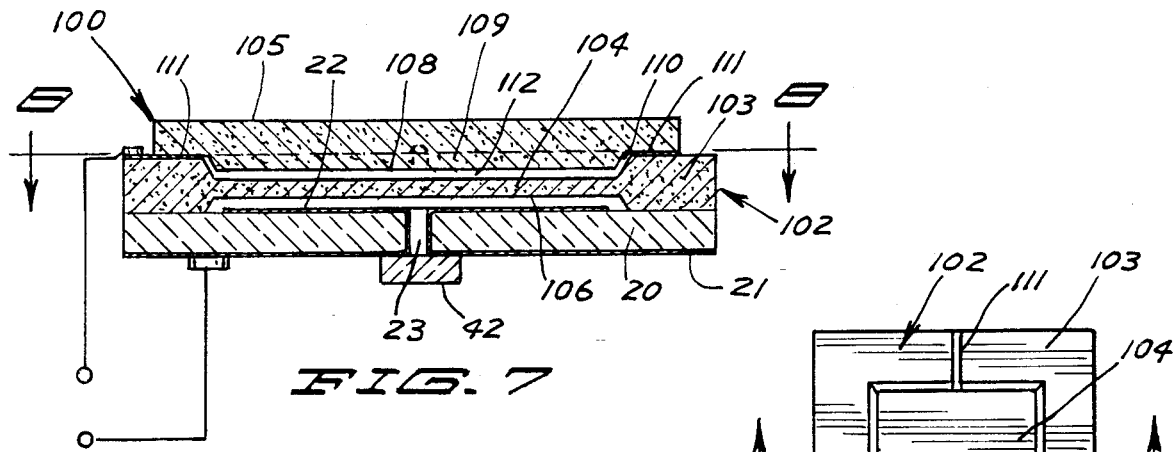
FIG. 7 is a sectional view of a modified form of fluid dampening apertures therein taken on line 7—7 in FIG. 8.
Figure 8:
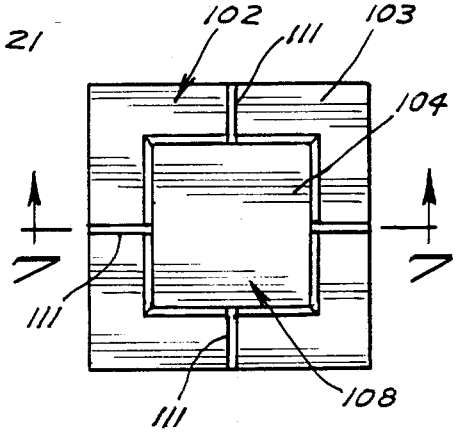
FIG. 8 is a plan view taken generally along line 8—8 in FIG. 7.

In FIGS. 7 and 8 a modified pressure sensor assembly indicated at 100 is illustrated and may be used in housing 76. The assembly 100 includes a glass disc or layer 20, and a diaphragm assembly 102 made in the same manner as diaphragm assembly 17, in a batch process based on a silicon wafer 10. The diaphragm assembly 102 is made of brittle material, as well, such as silicon, sapphire, quartz or glass, and has a peripheral rim 103 formed around a deflecting sensing diaphragm 104. The rim 103 is bonded to the layer 20, and the lower surface 106 of the diaphragm 104 is spaced from the metal layer 22 of the layer 20 to form a capacitance gap with diaphragm 104. Leads are taken from metalized layers on glass disc 20 as previously described. The leads may be connected to circuitry 85 and 86.

A cover 105 is placed over a cavity 108 formed on the opposite side of diaphragm 104 from surface 106. A boss 109 on cover 105 extends into cavity 108 and is spaced from diaphragm 104. The cover 105 is bonded in place. The cover 105 can be made of silicon if desired as well. The boss 109 forms a small volume chamber that can be filled with oil.

In this form of the invention, a shallow peripheral space 110 is defined around the boss 109 leading to cavity 108. Small passageways 111 are etched or micromachined in rim 103 (or in cover 105 if desired) and join this space 110. The passageways 111 extend across the top surface of the rim 103 as shown in FIGS. 7 and 8 to provide very small cross section, restricted passageways to the cavity 108 formed within the periphery of the rim 103 and above deflecting diaphragm 104.

A small volume chamber 112 is formed in cavity 108 and has restricted openings leading thereto for dampening movement of the deflecting diaphragm 104 after filling the chamber 112 with suitable oil.

Here, too, the frequency response of diaphragm 104 is dampened to a level compatable with the sampling rate of the circuitry used by providing a low volume chamber and thus a chamber that can be filled with silicone oil or other suitable dampening fluid, even with a small restriction or orifice for oil passage.

The dampening chamber is formed directly over the sensor assembly and does not depend on separate housings for providing the dampening.

The sensor assembly can be filled by back filling the dampening chamber 91 or 112 in a vacuum.

The sensor can be made in a batch process and the dielectric first layer 20 can be metalized to form both a capacitor plate and a lead attachment region connected by the metalized layer on the surfaces defining hole 23, which also can permit evacuating the capacitive chamber before the capacitive chamber is sealed.

Figure 9:
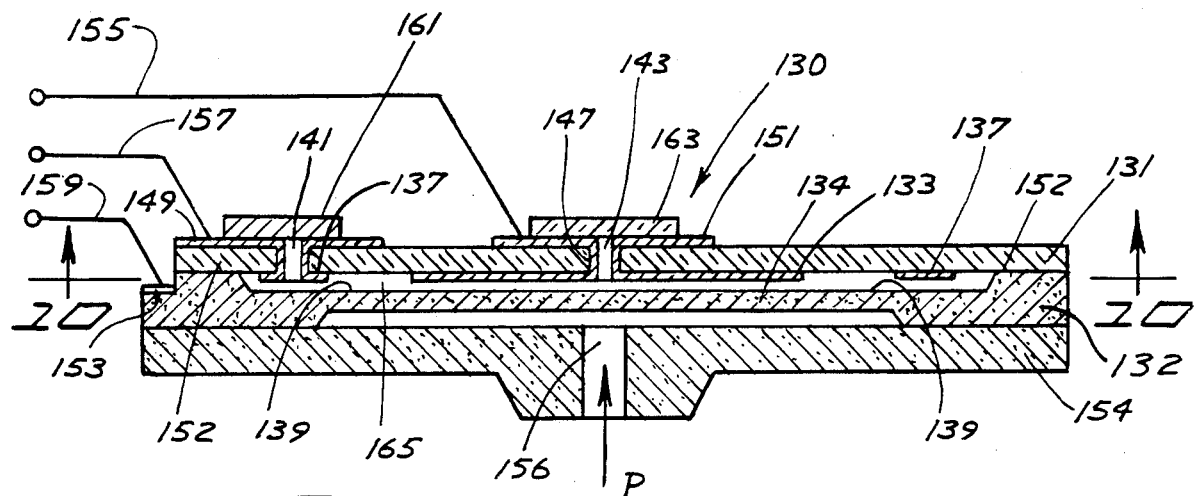
FIG. 9 is a sectional view of an individual pressure sensor modified to include a reference capacitor.
Figure 10:
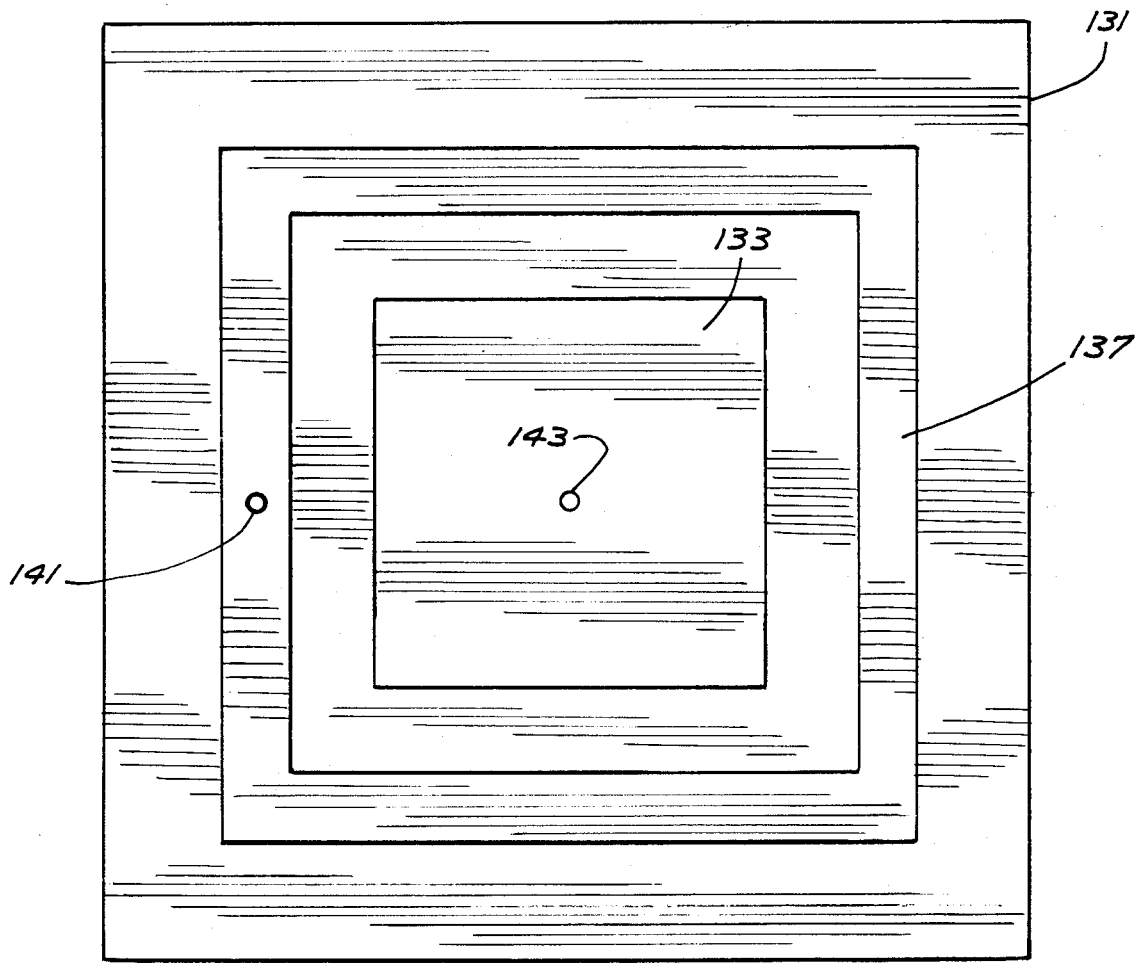
FIG. 10 is a plan view of the dielectric layer and metalization pattern for the pressure sensor of FIG. 9.

In FIGS. 9 and 10, a modified pressure sensor assembly indicated at 130 is illustrated. The assembly 130 includes a dielectric layer 131 which is metalized to provide a capacitor plate 133. A semiconductor layer 132 is formed with a deflecting diaphragm region 134 and the capacitor plate 133 is capacitively coupled to the semiconductor layer 132 at diaphragm region 134 to form a pressure sensing capacitance. A second metalized capacitor plate 137 is disposed on the dielectric layer 131 and is electrically isolated from capacitor plate 133. Capacitor plate 137 is also capacitively coupled to the semiconductor layer 132 at a non-deflecting portion 139 (which overlies a portion of the support rim for the deflecting diaphragm portion) to form a reference capacitance. The pressure sensing capacitance and reference capacitor are fabricated in the same structure and hence, the reference capacitance comprising plate 137 and region 139 has parameters such as temperature coefficients of capacitance and dissipation factor which are substantially matched to the parameters of the pressure sensing capacitance comprising plate 133 and diaphragm region 134.

Suitable holes 141 and 143 are drilled through the dielectric layer 131 and the walls of these holes are metalized to provide a feed-through electrical connection 145 from capacitor plate 137 to planar connection region 149 and a feed-through electrical connection 147 from capacitor plate 137 to planar connection region 151 as shown in FIG. 9.

The semiconductor layer 132 is shaped by etching to form the deflectable rectangular diaphragm region 134 underlying the capacitor plate 133 and the substantially rigid region 139 underlying the capacitor plate 137. The semiconductor layer 132 is bonded to the dielectric (glass) layer 131 at region 152 as shown in FIG. 9. A support layer 154 is bonded to the underside of semiconductor layer 132 and is similar to the support layer 30 shown in FIG. 2. A hole 156 is drilled in support layer 154 to admit a pressure P which will deflect the diaphragm region 134. The semiconductor layer 132 is metalized at surface 153 to form an ohmic contact to the semiconductor. Leads 155, 157 and 159 are connected to the sensor at metalized contact surfaces 153, 149 and 151 to provide connection to an external sensing circuit. The reference capacitance is coupled to leads 157 and 159; the pressure sensing capacitance is coupled to leads 159 and 155. The external sensing circuit compares the pressure sensing capacitance to the reference capacitance in a known manner to provide a measurement of the sensing capacitance which is corrected for parameter variations which are common to the pressure sensing capacitance and the reference capacitance.

Planar sealing bosses 161 and 163 are bonded to surfaces 149 and 151 respectively in a vacuum to provide a sealed, evacuated chamber 165 between capacitor plates 137 and 133 and the semiconducting layer 132.

Figure 11:
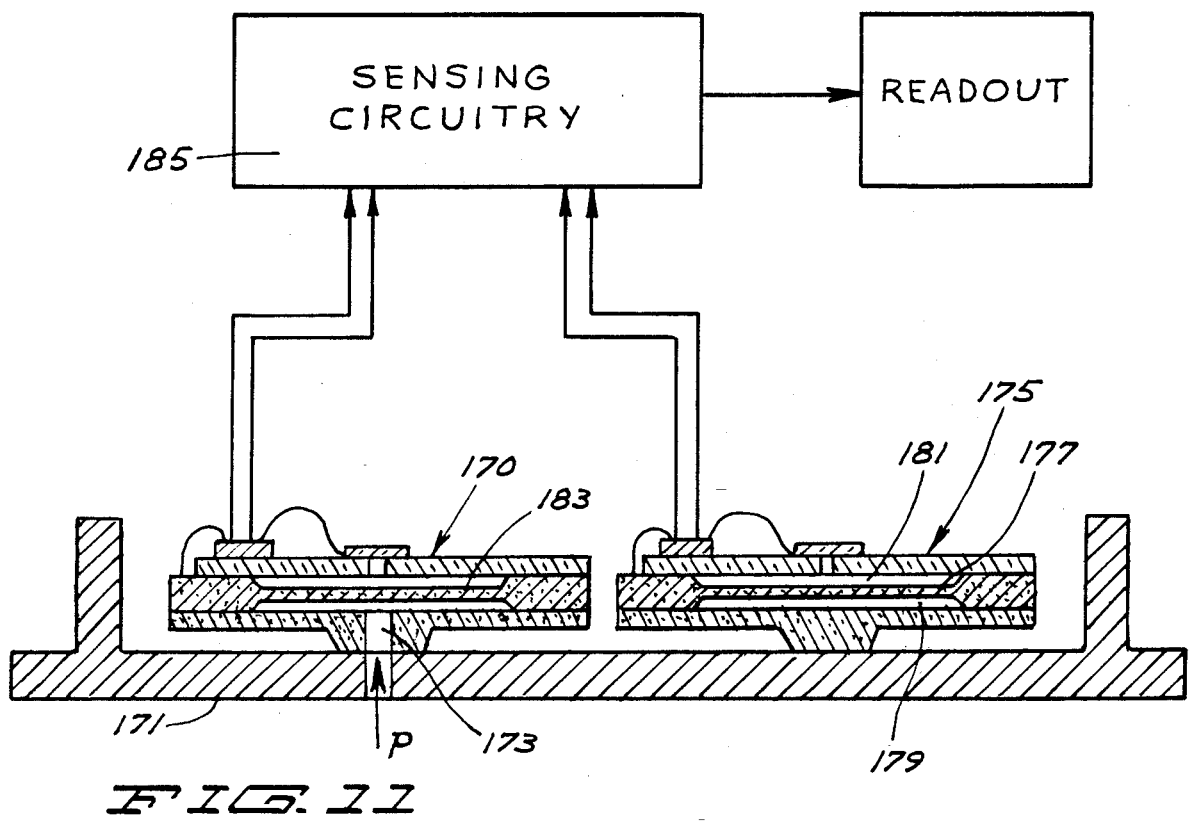
FIG. 11 is a sectional view of a sensor mounted with a reference capacitor according to this invention.

In FIG. 11, a pressure sensor 170 is shown that is similar to the sensor shown in FIG. 3. Sensor 170 is mounted to a housing 171 and has a diaphragm 183 which senses a pressure P applied to the sensor 170 through a hole 173 in the housing 171. A reference capacitor 175 is mounted in the housing spaced away from the sensor 170 but oriented in the housing in the same direction as sensor 170. Reference capacitor 175 is constructed in the same manner as sensor 170 except that there is no hole in capacitor 175 for admitting a fluid under pressure to the diaphragm 177; the diaphragm 177 has an evacuated chamber 179 below the diaphragm and an evacuated chamber 181 above the diaphragm. The similar construction and orientation of the sensor 170 and reference capacitor 175 cause the responses of the diaphragms 177 and 183 to vibration of the housing 171 to be substantially the same as one another. The sensor 170 and the reference capacitor 175 can be coupled to sensing circuitry 185 such that the effects of vibration on the capacitance of the pressure sensor 170 is effectively cancelled by a corresponding signal from the reference capacitor 175. Such an arrangement is particularly suitable for vehicular applications such as in aircraft, where vibration is present.

Figure 12:
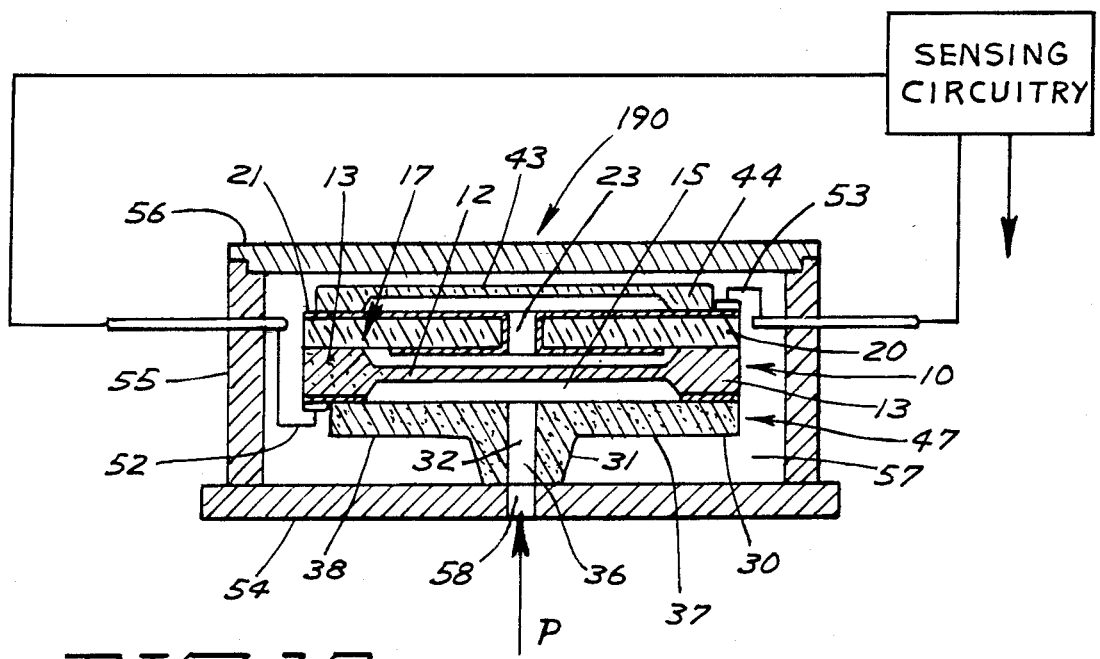
FIG. 12 is a sectional view of a sensor comprising an extended sealing layer.

In FIG. 12 a modified pressure sensor 190 is illustrated. The sensor 190 is similar to the sensor illustrated in FIG. 3 and corresponding reference numerals identify similar features in FIG. 3 and FIG. 12. The sealing boss 42 in FIG. 3 is not used in the sensor 190 of FIG. 12. In FIG. 12, a larger sealing boss 43 is used to seal hole 23. Sealing boss 43 extends over the hole 23 to a peripheral rim 44 which is sealed to the metalization 21 over the rim 13 of the diaphragm assembly 17. Sealing boss 43 is sealed to the metalization layer 21 using heat and a mechanical compression force. Arrangement of the sealing surface at the rim 44 avoids distortion of glass layer 20 during the sealing process.

The pressure sensors shown can be used for sensing very low to moderately high pressures, and since no organic materials are used, it is a high performance pressure sensor.

What is claim is:

1. A capacitive pressure sensor for connection to a capacitance sensing circuit providing an output representative of a sensed pressure comprising:
   a first layer formed of a dielectric material having at least one substantially planar surface spaced from a second opposite surface thereof and a first aperture extending through the first layer from the first planar surface to the second surface;
   electrical conductive means deposited on the first layer and extending over a first portion of the first planar surface for forming a first capacitor plate and extending over a portion of the second surface to form an electrical contact layer spaced away from the aperture and extending through the aperture to the first capacitor plate for connecting the first capacitor plate to a sensing circuit through the contact layer;
   a diaphragm layer formed of a brittle material having a rim surrounding a diaphragm sealingly bonded to the first surface of the first layer to surround the first capacitor plate, said diaphragm facing and being spaced from the first capacitor plate, said diaphragm forming a second capacitor plate in the brittle material responsive to a pressure applied to the diaphragm; and
   a sealing layer having a peripheral rim overlying the rim of the diaphragm layer to form a peripheral support, the peripheral rim having a sealing surface thereon bonded to the electrical conductive means on the second surface of the first layer for sealing the aperture to provide a reference pressure to the side of the diaphragm facing the first capacitor plate.

2. The capacitive pressure sensor of claim 1 wherein the diaphragm is formed in a layer of semi-conductor material.

3. The capacitive pressure sensor of claim 2 wherein the layer of semi-conductor material has a metal layer in ohmic contact with the semi-conductor material.

4. The capacitive pressure sensor of claim 3 and a fourth layer of material bonded to the semi-conductor layer on the second surface of the semi-conductor layer and spanning the diaphragm region, said fourth layer having an aperture for permitting fluid under pressure to be sensed to act on the diaphragm.

5. The capacitive sensor of claim 4 wherein the fourth layer includes a neck portion of substantially smaller dimension than the transverse width of the sensor, the aperture through the fourth layer passing through the neck.

6. The capacitive sensor of claim 5 wherein said neck has a mounting surface for mounting the sensor to said neck providing stress isolation means for isolating external stresses from the diaphragm.

7. The capacitive sensor of claim 4 wherein the fourth layer defines a chamber in combination with the diaphragm, and restricted aperture means defined between the chamber and the exterior of the sensor to restrict flow of fluids therethrough as the diaphragm deflects from a reference position.

8. A batch fabricated capacitive sensor comprising:
   a dielectric layer of rigid material having first and second surfaces;
   a diaphragm assembly comprising a second layer comprising an edge supported diaphragm sealingly bonded to the first side of the dielectric layer and forming a capacitor plate;
   said dielectric layer having an opening therethrough in registry with the diaphragm and a metal layer formed on both sides of the dielectric layer and through the opening; and
   a third layer having a peripheral rim overlying the diaphragm assembly's edge to form a peripheral support sealingly bonded to the metal layer on the second surface of the dielectric layer to overlie and seal the opening, a portion of said third layer being removed to expose the metal layer on the second side of the dielectric layer to provide an exposed metal surface for attachment of leads to such metal layer on the second side of the dielectric layer.

9. A pressure sensor for sensing the magnitude of a pressure comprising:
   a support layer having a opening therethrough and having a metal layer formed on both sides of the layer and through the opening;
   a layer of material including a diaphragm member surrounded by a diaphragm rim mounted on said support layer, said diaphragm and support layer having facing surfaces forming capacitive sensing means, and being spaced apart to provide capacitive spacing, said diaphragm being deflected toward said support layer when subjected to a pressure;
   a sealing layer disposed on the support layer having a peripheral rim overlying the diaphragm rim to form a peripheral support, the peripheral rim having a sealing surface thereon bonded to the metal layer for sealing the opening;
   means forming a dampening chamber on a side of said diaphragm opposite from said support layer, said means comprising a cover member overlying said diaphragm and being fixed with respect to the edges of the diaphragm to form a small volume dampening chamber disposed directly over the diaphragm, and
   opening means comprising a control orifice leading from said dampening chamber to the exterior, a filling of fluid provided within said dampening chamber, the pressure applied to said diaphragm causing flow of the filling of fluid in the dampening chamber through the control orifice such that the response of the diaphgragm is dampened.

10. The sensor as specified in claim 9 said diaphragm has a rim surrounding a deflecting central portion, said rim being fixed to said support layer, and said cover member being fixed to said rim, said control orifice being formed to extend across the diaphragm rim.

11. The sensor as specified in claim 9 wherein said diaphragm member has a rim surrounding a central deflecting portion, and said cover member is supported on said rim, said cover member having a boss that extends toward the diaphragm member within the space defined by the rim to restrict the volume in said dampening chamber, and said control orifice being defined in said cover member.

12. the sensor as specified in claim 9 wherein said sensor is mounted in an external housing, said external housing having an isolation diaphragm, and a fluid filled chamber in the housing surrounding said sensor.

13. The sensor as specified in claim 9 wherein said diaphragm is made of a brittle material.

14. The sensor of claim 12 wherein the diaphragm is made of silicon.

15. A capacitive sensor for sensing the magnitude of a pressure, comprising:
   a rigid support;
   a brittle diaphragm member mounted on said support, said diaphragm member and said support having facing surfaces closely spaced from each other;
   sensing means for sensing diaphragm deflection, said diaphragm member being deflected toward said support when subjected to a pressure;
   means forming a small volume dampening chamber on a side of said diaphragm opposite from said support comprising a cover member overlying said diaphragm and being fixed with respect to the edges thereof to form said small volume chamber;
   opening means comprising a passageway leading from said dampening chamber to the exterior;
   a filling of oil provided in said chamber, the pressure applied to said diaphragm acting only through said chamber and the filling of oil in the chamber to cause deflection of the diaphragm whereby movement of the diaphragm is directly related to fluid flow through the passageway; and
   circuit means for sampling the signal of the capacitive sensor at a desired frequency, the control orifice restricting the dynamic response of the diaphragm to a frequency not substantially greater than one-half of the sampling frequency.

16. A capacitive pressure sensor for connection to a capacitance sensing circuit providing an output representative of a sensed pressure comprising:
   a dielectric layer having an aperture extending therethrough between a substantially planar surface and an opposite second surface thereon;
   electrical conductive means for forming a first capacitor plate on the planar surface and forming an electrical contact on the second surface spaced away from the aperture and connecting through the aperture to the first capacitor plate;
   a semiconductor layer having a rim surrounding a diaphragm responsive to the pressure sealingly bonded to the planar surface around the first capacitor plate, said diaphragm forming a second capacitor plate facing and spaced from the first capacitor plate, the semiconductor layer also having a metal ohmic contact thereon;
   a sealing layer having a sealing surface thereon bonded to the electrical contact on the second surface of the dielectric layer for sealing the aperture to provide a reference pressure to the diaphragm;
   a fourth layer bonded to the semiconductor layer opposite the dielectric layer, said fourth layer having a neck substantially smaller than the width of the sensor with an aperture therethrough permitting the sensed pressure to act on the diaphragm; and
   a reference capacitor disposed in the sensor comprising a first reference capacitor plate disposed on the substantially planar surface and being coupled capacitively to a portion of the rim.

17. A capacitive pressure sensor for connection to a capacitance sensing circuit providing an output representative of a sensed pressure comprising:
   a dielectric layer having an aperture extending therethrough between a substantially planar surface and an opposite second surface thereon;
   electrical conductive means for forming a first capacitor plate on the planar surface and forming an electrical contact on the second surface spaced away from the aperture and connecting through the aperture to the first capacitor plate;
   a semiconductor layer having a rim surrounding a diaphragm responsive to the pressure sealingly bonded to the planar surface around the first capacitor plate, said diaphragm forming a second capacitor plate facing and spaced from the first capacitor plate, the semiconductor layer also having a metal ohmic contact thereon;

a sealing layer having a sealing surface thereon bonded to the electrical contact and overlying the aperture for sealing the aperture to provide a reference pressure to the diaphragm;

a fourth layer bonded to the semiconductor layer opposite the dielectric layer, said fourth layer having a neck substantially smaller than the width of the sensor with an aperture therethrough permitting the sensed pressure to act on the diaphragm;

a base member bonded to the neck; and a reference capacitor bonded to the base member and spaced away from the fourth layer and coupled to the sensing circuit such that vibration sensitivity of the output is reduced.

* * * * *

UNITED STATES PATENT AND TRADEMARK OFFICE
CERTIFICATE OF CORRECTION

PATENT NO. : 4,730,496

DATED : March 15, 1988

INVENTOR(S) : Thomas A. Knecht et al.

It is certified that error appears in the above-identified patent and that said Letters Patent is hereby corrected as shown below:

Column 1, lines 21-22, delete "miniature silicon" and insert —Miniature Silicon—; line 49, delete "circuites" and insert —circuits—; line 58, delete "volumentric" and insert —volumetric—.

Column 2, line 28, delete "wil" and insert —will—.

Column 5, line 21, delete "first" and insert —frit—.

Column 6, line 17, delete "Streas" and insert —Stress—.

Column 8, line 15, delete "compatable" and insert —compatible—.

Column 9, line 60, delete "claim" and insert —claimed—.

Column 11, line 7, delete "a" (second occurrence) and insert —an—; line 36, delete "diaphgragm" and insert —diaphragm—; line 50, after "12.", delete "the" and insert —The—.

Signed and Sealed this

Fifteenth Day of November, 1988

Attest:

DONALD J. QUIGG

Attesting Officer

Commissioner of Patents and Trademarks